United States Patent [19]

Fountain et al.

[11] 4,120,935

[45] Oct. 17, 1978

[54] DUMP LEACHING OF COPPER

[75] Inventors: Gerald F. Fountain; Jaime Veloz; Harry R. Dahlberg, all of Inspiration, Ariz.

[73] Assignee: Inspiration Consolidated Copper Company, Morristown, N.J.

[21] Appl. No.: 850,442

[22] Filed: Nov. 11, 1977

Related U.S. Application Data

[63] Continuation of Ser. No. 692,935, Jun. 4, 1976, abandoned.

[51] Int. Cl.² ............................................. C22B 15/08
[52] U.S. Cl. ................................... 423/41; 75/101 R; 75/117
[58] Field of Search ...................... 423/27, 36, 41, 45; 75/101 R, 115, 104, 117

[56] References Cited

U.S. PATENT DOCUMENTS

| | | | |
|---|---|---|---|
| 2,563,623 | 8/1951 | Scott | 75/104 |
| 3,777,004 | 12/1973 | Lankenau | 75/101 R |
| 3,808,306 | 4/1974 | Smith et al. | 75/101 R |
| 3,868,439 | 2/1975 | Wadsworth | 423/41 |
| 4,017,309 | 4/1977 | Johnson | 423/41 |

Primary Examiner—Brian Hearn
Attorney, Agent, or Firm—Pennie & Edmonds

[57] ABSTRACT

The improvement in the method of recovering copper from low grade ore containing oxidized copper ore which comprises establishing a dump of such ore in fragmented form, substantially completely wetting the ore in the dump with strong aqueous sulfuric acid containing at least about 100 g/l $H_2SO_4$, allowing the acid wetted ore to age for a period of at least about three days, thereafter washing the aged ore with dilute aqueous sulfuric acid containing about 5 to 40 g/l $H_2SO_4$, collecting such washings, and recovering copper therefrom.

8 Claims, No Drawings

DUMP LEACHING OF COPPER

This is a continuation of application Ser No. 692,935, filed June 4, 1976, now abandoned.

BACKGROUND OF THE INVENTION

Dump leaching is now an accepted method of recovering copper from sub-standard copper-bearing materials including some material categorized as waste, such as dumps formed in earlier decades from copper mining operations.

Most leach dump operations involve a mixed oxide-sulfide ore and are leached with dilute sulfuric acid solutions. Generally, dump leaching is performed with minimal solution control and recoveries do not exceed 40 to 60% of the copper present in the ore after periods up to five years of leaching. Recoveries are even poorer when the ore body to be leached contains totally or substantially totally oxidized copper minerals such as tenorite and melaconite. In such ore bodies, a large portion of the copper, up to 50% or more, assays as non-acid soluble copper which, in essence, lowers the effective grade of the material to be leached by 50%. Thus, with an ore body having about 0.3% copper, the effective grade of the material to be leached is only 0.15%.

Efforts to improve upon the recovery of the non-acid soluble fraction have not been successful. Such efforts have included the use of high concentrations of sulfuric acid to leach, over 100 g/l, and techniques involving crushing the ore, agglomerating with a strong acid, and curing for a period of time before performing the typical leaching. In the case of leaching with high concentration of acid, there were the evident problems of high acid consumption by the ore and high residual acid off the dumps to the precipitation plant. The high cost involved in terms of cost of acid and handling of the high residual acid make such procedure uneconomical and undesirable. At today's high cost, crushing and handling of the ore is also unsuitable because it is uneconomical.

SUMMARY OF THE INVENTION

A leaching method of recovering copper from low grade oxidized copper ore has now been found which is economical, rapid, and with high recovery of copper.

Briefly stated, the present invention comprises the method of recovering copper from low grade ore containing oxidized copper ore which comprises establishing a dump of such ore in fragmented form, substantially completely wetting the ore in the dump with strong aqueous sulfuric acid containing at least about 100 g/l $H_2SO_4$, allowing the acid wetted ore to age for a period of at least about three days, thereafter washing the aged ore with dilute aqueous sulfuric acid containing about 5 to 40 g/l $H_2SO_4$, collecting such washings, and recovering copper therefrom.

DETAILED DESCRIPTION

While the instant invention can be applied to a dump containing any type of copper-containing ores, it is especially useful for those designated as oxide copper minerals and will be described in connection therewith. Such oxide copper minerals include the more easily leached ones such as azurite, malachite, chrysocolla, native, and the like as well as those more difficult to leach such as cuprite, tenorite, melaconite, and the like. It is the latter group that, because it is difficult to leach, assays as "non-acid soluble copper". More correctly, such minerals are acid soluble, but not under the usual acid leaching conditions.

In accordance with the present invention, the essential first step is completely wetting (saturating) the dump with strong aqueous sulfuric acid containing at least about 100 g/l $H_2SO_4$; preferably 200 to 300 g/l $H_2SO_4$. Acid concentrations below about 100 g/l $H_2SO_4$ result in rates of recovery that are too slow as well as decreased percentages of recovery. With acid levels above 300 g/l $H_2SO_4$, the increased cost of the acid makes such use uneconomical.

The volume of strong $H_2SO_4$ solution required to saturate the dump depends on the ore nature and dump structure, particularly the size of the rock placed in the dump and the height of the dump. It is preferred to use dumps no more than about 10 to 20 feet high since this depth of dump minimizes channeling and allows for optimum recovery of copper during the first leaching contact. Usually, however, for saturation of all types of dumps the volume of strong acid solution required will be equal to 5 to 15% of the total weight of the dump. More precise calculations can be readily made for each dump as illustrated for a dump consisting approximately of 70,000 tons, laid on a 10 foot lift.

Acid Volume Calculation

The flow rates and ultimate tonnage of acid used for the saturation of the dump were calculated from an empirical relationship Area ft²/tons per lift. For 10 ft. lifts:

$$\frac{\text{Area ft}^2}{\text{tons per lift}} = .90$$

If no problems are encountered with percolations in the dump, the flow rate can be raised up to 100 gallons per $10^4$ ft² or higher if necessary. This will depend, of course, on the percolation characteristics of the ore.

The volume of solution to dump is calculated at 14 gpm per 10,000 ft² of area. This flow rate is estimated from practical observations since a higher rate will cause pooling of solutions. Using the area ft²/ton ratio, the total area came out to be 63,000 ft². If 14 gpm per $10^4$/ft² flow rate is used, the solution flow to the dump amounts roughly to 88.2 gpm. Using leaching column data of 0.07 ft/hr vertical flow rate, the solution would penetrate 1.68 ft/day so in a 10 foot lift the saturation would theoretically take 5.95 days. In practice, the period for the solution covering the dump and achieving saturation was about 10.2 days. This calculates roughly to 7% of the dump ore by weight.

With the normal addition of 88.2 gpm to the dump in 10.2 days, 1,294,447 gallons of solution of 200 g/l acid concentration is required. This amounts to 980 tons of $H_2SO_4$ total or 96 tons per day.

From the foregoing, it is evident the volume of strong acid solution required for any particular dump can be readily determined.

After the entire dump has been saturated, i.e., the strong acid has percolated through the dump, a setting or aging period is required. This aging of the acid wetted ore can be for a period as short as one day up to a period of 40 days or longer. Preferably, aging should be for a period of not less than 3 days and should be for at least 10 days up to 30 days. Aging can be continued beyond 40 days, if desired, but maximum recoveries reach a plateau within 40 days and longer aging is generally not needed to increase recovery.

Recovery of the copper from the aged ore is accomplished by conventional leaching techniques with the usual $H_2SO_4$ solutions containing from about 5 to 40 g/l $H_2SO_4$; most suitable, about 5 to 30 g/l $H_2SO_4$. The washing with the dilute $H_2SO_4$ is carried out for the period necessary to recover the maximum amount of copper. In almost all situations, this can be determined by analyzing the copper in the solution coming off the dump and stopping the leach when the copper in such solution comes down to 1 g/l or less. At this point, further leaching becomes costly. Usually, such low levels of copper do not come about until at least about after 30 days of leaching. In almost all situations, washing should be carried out for at least 30 days and can continue profitably in some instances for period up to 90 days or longer.

In order to get a good wash and percolation of the leaching $H_2SO_4$ solution through the dump, there is used a volume of such solution from about 5 to 10 times the volume of the strong acid used to age the ore. Lesser volumes may not insure good washing.

This novel procedure frees not only the acid soluble copper but the copper classified as non-acid soluble in an economic and practical manner.

The copper in the washings is then recovered using any of the usual techniques commonly employed for that purpose.

It will be evident that the instant method is applicable not only to existing dumps, but to the leaching of newly mixed oxide copper ores which can be formed into pads (dumps) and then treated in accordance with the present invention. The method is also applicable to copper bearing ores having mixed sulfide-oxide minerology.

The invention will be further described in connection with the following examples which are set forth for purposes of illustration only and in which proportions are by weight unless expressly stated to the contrary.

EXAMPLE 1

A bulk sample of ore from a copper-containing deposit whose copper content varied from about 0.23 by 0.35% was obtained and a series of bench scale tests performed on minus one inch size fraction screened out from this sample. The ore sample contained no significant sulfide minerals and from 40 to 50% thereof was non-acid soluble copper; mainly hard to leach oxide minerals. Leaching was conducted in columns simulating dump leaching conditions.

The leaching process consisted of applying a fixed volume corresponding to 7% of the ore weight of 200 g/l $H_2SO_4$ to each column and then letting them stand for 1, 3, 5, 10, and 15 days. This allowed sulfation of copper from the different minerals to take place.

A washing period using 5 g/l $H_2SO_4$ then followed. The results generated were as set forth in Table I.

TABLE I

| Sample # | % T. Cu | % Acid Sol Cu | % Non Acid Sol Cu | Aging Time Days |
|---|---|---|---|---|
| Head | .369 | .165 | .204 | — |
| Tail 1 | .181 | .038 | .143 | 1 |
| Tail 2 | .157 | .029 | .128 | 3 |
| Tail 3 | .148 | .027 | .121 | 5 |
| Tail 4 | .128 | .024 | .104 | 10 |
| Tail 5 | .112 | .021 | .091 | 15 |

According to the data obtained it is apparent that the high acid concentration curing process will effectively dissolve the hard to leach copper minerals. It is also apparent that the final extraction will be depending heavily on the curing time.

EXAMPLE 2

An experimental dump (pad) was constructed using bulk material from Inspiration Consolidated Copper Company's Lower Ox-Hide ore deposit. The dump consisted of roughly 70,000 tons, laid on a 10 foot lift. A solution of 200 g/l $H_2SO_4$ was applied to the pad at the flow rate of 14 gpm per 10,000 ft$^2$ (roughly 88.2 gpm) for 10.2 days. This amount to 96 tons of $H_2SO_4$ per day or 980 total tons of $H_2SO_4$ (1,294,447 gallons of solution at 200 g/l acid concentration).

The acid wetted ore was then permitted to age for 15 days, followed by washing with 5 g/l $H_2SO_4$ for 45 days.

After the pad was built, the complete surface was divided in numerated segments. This was done to obtain the maximum degree of randomization when sampling for head and tails.

Eight samples of approximately 500 lbs. each were augered from different segment. Each of them was split to about 50 lbs. samples and crushed to minus 6 mesh.

From this, head samples were cut and prepared for assaying. Also, 100 gram samples were cut for laboratory leaching. These leaches maintained all the controlling factors used in the testing of the pad.

In comparing the laboratory and testing pad assays, the results were as set forth in Table II.

TABLE II

| Segment # | Heads | | Laboratory Tails | | Experimental Pad Tails | |
|---|---|---|---|---|---|---|
| | % T. Cu | % Ox Cu | % T. Cu | % Ox Cu | % T. Cu | % Ox Cu |
| 9 | .364 | .245 | .061 | .012 | .124 | .052 |
| 3 | .364 | .224 | .071 | .015 | .048 | .013 |
| 8 | .318 | .179 | .059 | .013 | .070 | .046 |
| 19 | .410 | .255 | .066 | .015 | .067 | .027 |
| 15 | .461 | .336 | .071 | .017 | .189 | .103 |
| 12 | .453 | .304 | .065 | .015 | .040 | .017 |
| 22 | .326 | .181 | .071 | .012 | .051 | .025 |
| 7 | .389 | .243 | .072 | .016 | .028 | .011 |
| Average | .386 | .246 | .067 | .014 | .077 | .037 |

According to the data obtained, a shorter wash cycle may be used depending on the percolation characteristics of the ore being treated. The degree of washing would be proportional to the amount of solution used on the washing cycle.

The sampling locations were the same for heads and tails. This was done in order to avoid discrepancies in the ore and mineral distributions.

The apparent difference between the laboratory and operation recoveries without doubt is due to the more efficient washing step done to the laboratory tails prior to being assayed.

While the invention has been described in connection with preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. The method of recovering copper from low grade oxidized copper ore containing a substantial amount of tenorite, melaconite, or other oxidized mineral substantially insoluble in dilute aqueous sulfuric acid which comprises establishing a dump of such ore in fragmented form; said dump being a depth of at least about 10 feet, percolating into said dump a strong aqueous sulfuric acid solution containing at least about 200 g/l $H_2SO_4$ until the ore fragments are substantially completely wetted, then discontinuing such percolation and allowing the wetted ore to age in contact with the strong acid for a period from about 10 to 30 days, then percolating through the dump a washing of dilute aqueous sulfuric acid containing about 10 to 30 g/l $H_2SO_4$, collecting the washings, and recovering copper from said washing.

2. The method according to claim 1, wherein the height of the dump into which the strong acid is percolated does not exceed about 20 feet.

3. The method according to claim 1 wherein the working of the aged dump is continued until the copper content of the washings becomes less than about 1 g/l.

4. The method according to claim 1 wherein the amount of dilute acid used for washing the dump is from about five to about ten times the volume of the strong acid initially percolated into the dump.

5. The method of recovering copper from low grade ore containing oxidized copper ore consisting essentially of establishing a dump of such ore in fragmented form, said dump being of a depth of at least about 10 feet, substantially completely wetting the ore in the dump with strong aqueous sulfuric acid containing at least about 100 g/l $H_2SO_4$, allowing the acid wetted ore to age in the dump for a period of at least about three days, thereafter washing the aged ore in the dump with dilute aqueous sulfuric acid containing about 5 to 40 g/l $H_2SO_4$, collecting such washings, and recovering copper from said washings.

6. The method according to claim 5 wherein the aging period is of from 5 to 30 days.

7. The method according to claim 5 wherein the strong acid with which the ore is wetted prior to aging contains 200 to 300 g/l $H_2SO_4$.

8. The method according to claim 5 wherein the aged ore is washed with dilute acid containing 10 to 30 g/l $H_2SO_4$.

* * * * *